G. E. GARRETT.
DUST COVER FOR TIRE VALVES.
APPLICATION FILED AUG. 2, 1920.

1,381,627.

Patented June 14, 1921.

Inventor
Gordon Eugene Garrett

By Dodge and Sons

Attorneys

UNITED STATES PATENT OFFICE.

GORDON EUGENE GARRETT, OF SALT LAKE CITY, UTAH.

DUST-COVER FOR TIRE-VALVES.

1,381,627.

Specification of Letters Patent. Patented June 14, 1921.

Application filed August 2, 1920. Serial No. 400,730.

*To all whom it may concern:*

Be it known that I, GORDON EUGENE GARRETT, a citizen of the United States, residing at Salt Lake City, in the county of Salt Lake and State of Utah, have invented certain new and useful Improvements in Dust-Covers for Tire-Valves, of which the following is a specification.

This invention relates to clamp nuts and dust caps for the valve stems of pneumatic tires.

The invention provides a device in which the dust cap alone, or both the dust cap and the clamp nut may be removed from the valve stem very quickly and easily, and in which these parts so interact as to insure positive locking of the clamp nut on the valve stem.

It is now the usual practice to thread the clamp nut on the valve stem and screw it down against the felly to lock the valve stem. The dust cap in the usual construction is also threaded on the valve stem and is screwed down against the clamp nut to act as a jam nut and prevent the clamp nut from backing off or loosening. The threads on valve stems are fine and the stems are commonly quite long so that applying and removing dust caps and clamp nuts are tedious operations.

The clamp nut of the present invention is so formed as to fit standard valve stems, but is so designed as to seat against the felly after only a few turns. Furthermore, it is provided with a tapered split portion capable of being contracted or closed upon the valve stem to clamp the latter.

The dust cap is threaded upon the clamp nut and operates after a few turns to engage the tapered split portion of the clamp nut and contract it into binding engagement with the valve stem. Thus the clamp nut is tightly locked in place. The dust cap is at the same time securely held by its frictional engagement with the tapered portion of the clamp nut, but may be applied and released by a relatively small rotary movement.

A successful embodiment of the invention is shown in the drawing in which.

Figure 2:
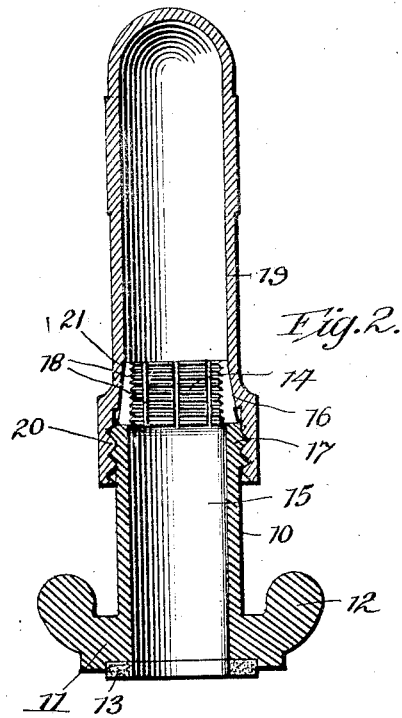
Fig. 2 is a longitudinal axial section of a clamp nut and dust cap screwed together.
Figure 1:
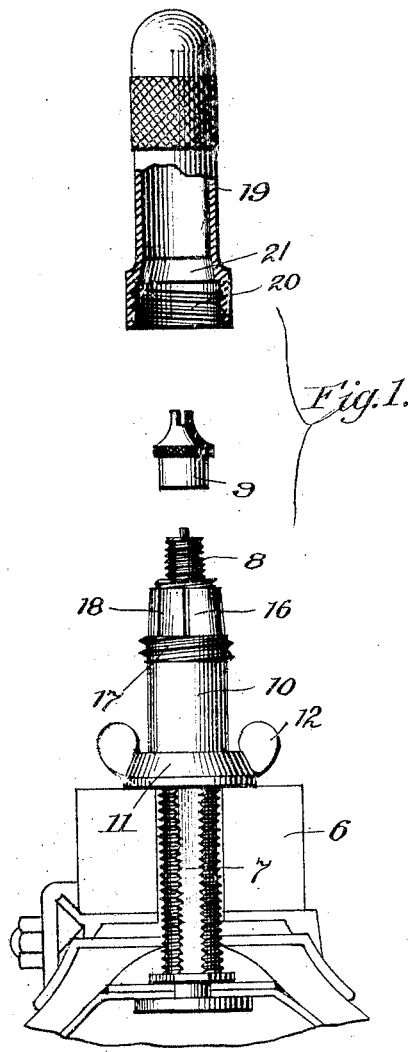
Figure 1 is a side view of the device, the clamp nut being shown in position on a valve stem and the dust cap being removed and part of it being broken away to show the internal construction.
Figure 3:
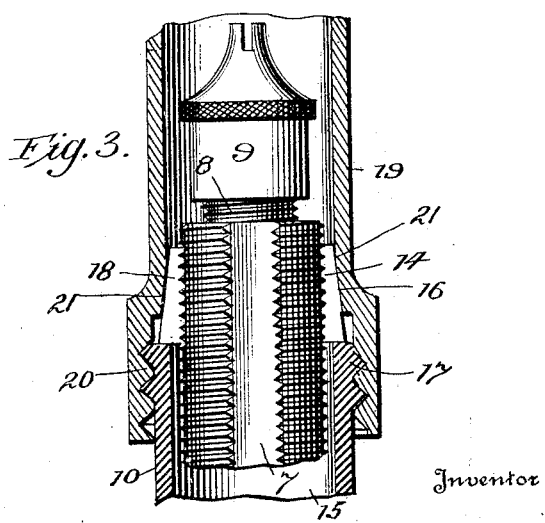
Fig. 3 is a fragmentary section on an enlarged scale showing the tapered split portion of the clamp nut and its operative relation to the valve stem and dust cap.

In the drawings the felly of an automobile wheel is shown at 6. The valve stem is shown at 7 and, as is usual, is externally threaded throughout substantially its entire length. It is shouldered down at its end leaving a threaded projecting portion 8 to receive the small valve cap 9. These parts are at present nearly standardized, except as to the projection of the stem from the felly which varies somewhat according to the style of wheel and demountable rim used. The parts so far described are illustrated as they ordinarily occur in present practice, but obviously they may be modified.

On the stem 7 I thread a clamp nut 10 whose total height is only slightly less than the projection of the valve stem. To secure satisfactory fit with valve stems which project different distances I contemplate the manufacture of three lengths of clamp nut.

The form of the nut 10 is clearly shown in the drawings. It includes a tubular sleeve having a flange or rim 11 at its base and provided with wings 12 by which the nut may be turned down tight. The lower face of the flange 11 is counterbored to receive a leather or other washer 13.

The bore of the nut is threaded at its upper end at 14 to fit stem 7. There are only a few of these threads 14, but enough to give the necessary strength. Below these threads the nut is counterbored as shown at 15 to a diameter larger than the outside diameter of stem 7. The outer surface of the nut, surrounding threads 14 is tapered as shown at 16 and below this tapered portion is a coarse relatively quick pitch thread 17. The tapered portion 16 is longitudinally slotted as indicated at 18, so as to form several resilient clamping fingers which, when forced in, produce tight clamping between threads 14 and stem 7.

The dust cap 19 is tapped at 20 to fit threads 17 on nut 10 and above the tapped portion 20 has an annular tapered shoulder 21 which fits taper 16. Thus nut 10 may be tightly clamped on stem 7 by screwing cap 19 tightly into place.

By adopting the above construction it is possible to design a nut which will seat in from four to eight turns at most (according to the length of stem). The dust cap can be made to screw to place in about one and one half turns; its locking action on the nut occurring in the final one-fourth turn. Due to the friction of taper engagement there is no danger of the cap working off, even where the thread 17 has a relatively quick pitch.

The dust cap and nut may be removed successively, or the two may be removed together by first backing the cap about a quarter turn to unclamp the nut, and then turning the nut off with cap in place. The gain in time and convenience over the present constructions, in which always the nut, and usually also the cap must be unscrewed for the full length if valve stem projection, is marked.

Having thus described my invention what I claim is:—

1. The combination with a threaded valve stem, of a nut threaded on said stem; a releasable clamp carried by said nut, serving when set to lock said nut against rotation on said stem; and a removable dust cap serving to set or release said clamp by the application and removal of the dust cap.

2. The combination with a threaded valve stem, of a nut threaded on said stem, said nut including a releasable clamp portion formed integrally therewith, and serving, when set, to lock said nut against rotation on said stem; and a dust cap removably threaded on said nut and adapted to engage and clamp said releasable clamp portion.

3. The combination with a threaded valve stem of a nut threaded thereon, and having a tapered contractible portion capable of being closed into clamping engagement with said valve stem; and a threaded dust cap serving to engage and contract said tapered portion.

4. The combination with a threaded valve stem, of a nut threaded thereon, and having a tapered contractible portion capable of being closed into clamping engagement with said valve stem; and a dust cap threaded on said nut and having a taper socket serving to engage and contract said tapered portion when said cap is screwed home.

5. The combination with a felly and a valve stem projecting therefrom, of a sleeve nut approximately coextensive with the projection of said stem, bearing against said felly and in threaded engagement with said stem only near the end of the latter; and a dust cap threaded on said nut.

6. The combination with a felly and a valve stem projecting therefrom, of a sleeve nut approximately coextensive with the projection of said stem, bearing against said felly and in threaded engagement with said stem only near the end of the latter, clamping means carried by said nut and operable to clamp the nut against rotation on said stem; and a removable dust cap serving to set and release said clamping means.

7. The combination with a felly and a valve stem projecting therefrom, of a sleeve nut approximately coextensive with the projection of said stem, bearing against said felly and in threaded engagement with said stem only near the end of the latter; a tapered contractible clamping portion formed on the end of said nut; and a dust cap threaded over said sleeve nut and having a socket adapted to engage the tapered contractible portion of said sleeve nut, and serving thereby to clamp said nut on said stem when said cap is screwed home.

In testimony whereof I have signed my name to this specification.

GORDON EUGENE GARRETT.